US008297201B2

(12) United States Patent
Mercier et al.

(10) Patent No.: US 8,297,201 B2
(45) Date of Patent: Oct. 30, 2012

(54) METHOD TO HIGH AVAILABILITY CONTROL FOR RAILWAY DOORS SYSTEMS, ON BOARD SYSTEM AND APPLICATION TO ACCESSORIES AND SURROUNDINGS OF DOORS

(75) Inventors: Christophe Mercier, Veretz (FR); Francis Dupuy, Savonnires (FR)

(73) Assignee: Faiveley Transport, Saint Denis (FR)

( * ) Notice: Subject to any disclaimer, the term of this patent is extended or adjusted under 35 U.S.C. 154(b) by 305 days.

(21) Appl. No.: 12/002,302

(22) Filed: Dec. 14, 2007

(65) Prior Publication Data
US 2009/0139147 A1 Jun. 4, 2009

(30) Foreign Application Priority Data
Nov. 30, 2007 (EP) .................................... 07291434

(51) Int. Cl.
*B60N 5/00* (2006.01)
(52) U.S. Cl. ..................... 105/332; 105/333; 246/169 R
(58) Field of Classification Search .................. 105/332, 105/333; 49/13, 14, 506; 246/169 R
See application file for complete search history.

(56) References Cited

U.S. PATENT DOCUMENTS

| | | | |
|---|---|---|---|
| 1,979,569 A | | 11/1934 | Parvin |
| 3,778,806 A | * | 12/1973 | Williams ........................... 49/13 |
| 4,652,862 A | * | 3/1987 | Verslycken ................... 340/540 |
| 4,904,880 A | | 2/1990 | Yoshida |
| 5,121,410 A | | 6/1992 | Demarais |
| 5,291,686 A | * | 3/1994 | Sears et al. ...................... 49/322 |
| 5,838,126 A | | 11/1998 | Llerena |
| 6,141,908 A | * | 11/2000 | Bowen ............................ 49/281 |
| 6,401,629 B1 | * | 6/2002 | Brunooghe .................... 105/341 |
| 6,591,760 B2 | * | 7/2003 | Brunooghe .................... 105/341 |
| 6,863,000 B2 | * | 3/2005 | Neugebauer .................. 105/332 |
| 6,894,613 B2 | * | 5/2005 | Stab ........................... 340/545.1 |
| 6,925,942 B2 | * | 8/2005 | Yokomori ..................... 105/332 |
| 7,751,906 B2 | | 7/2010 | Arzig |
| 2007/0294361 A1 | * | 12/2007 | Arzig ............................. 709/208 |
| 2009/0084909 A1 | * | 4/2009 | Bramauer et al. ......... 246/169 R |
| 2009/0139147 A1 | * | 6/2009 | Mercier et al. .................. 49/506 |
| 2009/0173006 A1 | * | 7/2009 | Jitsuishi et al. ................... 49/31 |

FOREIGN PATENT DOCUMENTS

| | | |
|---|---|---|
| CA | 2027205 | 10/1990 |
| DE | 3921157 | 10/1990 |
| EP | 0423028 | 4/1991 |
| EP | 423028 A1 * | 4/1991 |
| EP | 0452201 | 10/1991 |
| EP | 0465281 | 1/1992 |
| EP | 0728894 | 8/1996 |

(Continued)

*Primary Examiner* — Jason C Smith
(74) *Attorney, Agent, or Firm* — Harness, Dickey & Pierce, P.L.C.

(57) ABSTRACT

The invention aims at increasing the availability of doors systems without affecting the reliability of control systems. For this purpose, the invention provides to take advantage of the alternating operation of door systems positioned on either side of the same car.

An on-board panel system according to the invention includes associated control panels control means for transmitting authorization signals for the exclusive opening of side doors. The control means combine a low speed signal and a validation side selection signal to carry out, in each environment, opening/closing authorizations of the motor control of its environment and the motor control of the associated environment.

Applications to the accessories and the mechanical part of the railway door systems (motors, latch fittings, loudspeakers, etc) as well as their door environment (interface with the communication network).

12 Claims, 13 Drawing Sheets

FOREIGN PATENT DOCUMENTS

| | | |
|---|---|---|
| EP | 0903275 | 3/1999 |
| EP | 1764464 | 3/2007 |
| FR | 2709720 | 3/1995 |
| WO | WO 2006042779 A1 * | 4/2006 |
| WO | WO 2007014735 A1 * | 2/2007 |

* cited by examiner

METHOD TO HIGH AVAILABILITY CONTROL FOR RAILWAY DOORS SYSTEMS, ON BOARD SYSTEM AND APPLICATION TO ACCESSORIES AND SURROUNDINGS OF DOORS

CROSS-REFERENCE TO RELATED APPLICATIONS

This application claims priority to European Patent Application No. 07291434.4, filed Nov. 30, 2007, which is incorporated by reference herein.

BACKGROUND AND SUMMARY

The invention relates to a high availability control method for railway door systems, making it possible, in case of failure, to have the possibility to open and close the doors of a railway car, and also relates to an on-panel system for implementing such a method. The invention applies to the door accessories, in particular to sound output devices for loud-speakers and to latch fittings, as well as to door environments in connection with the railway communication network lines.

Here, railway car or car means a rigid unit for railway transportation, an assembly of railway cars connected together and constituting a train set, a tramway or any rail-guided transportation means. A "door system" includes all the control means in particular the control panel, the mechanical means of the door proper, as well as the electromechanical accessories such as sensors, activators; push-buttons, buzzers, loud-speakers, warning lights, limit switch elements etc.

Statistically, failures of passenger railway transportation can be attributed to access doors in a proportion of approximately 30 to 40%. Besides, the door control electronics amounts to 40 to 50% of all the failures of such doors. In order to improve such availability, it is known to increase the frequency of the equipment maintenance. Thus, document EP 0 728 894 discloses an emergency control allowing to open the doors in case of a failure of the main power supply. Such type of solution is expensive and requires an increased immobilization of cars.

It is also well known to add, to the existing system, a system which is a dual door control means to preserve the control in case of a failure of a system. However, this solution is also expensive and multiplies the number of components to be used. Such multiplication entails a substantially lower reliability, since the risk of failure then increases in the same proportions as the number of components.

Thus, the invention aims at increasing the availability of the door systems without affecting the reliability of the control system. For this purpose, the invention provides to take advantage of the alternative operation of the door systems positioned, on either side of a car. More precisely, the object of the invention is to provide a high availability control method for railway door systems of a car, positioned along two opposite longitudinal sides of the car, consisting in detecting a failure control of a first accessory whose opening or closing has been requested, transmitting the failing control to the operational control of at least one associated accessory, positioned along the opposite longitudinal side, and substituting the failing control with said associated operational control. Such a method makes it possible not to duplicate the equipment of a train while keeping a high availability of operation of the doors whose opening or closing has been requested.

According to particular embodiments of the method:

the associated accessories are automatically managed by a mutual checking of the controls through periodical exchanges between both controls and a takeover of an assumed failing control in the absence of a periodical detection, by neutralizing such control and by transferring the opening authorizations to the associated control from a combination between a low speed signal and a validation side selection signal;

the environmental and functionality information of each door are analyzed in order to detect operation anomalies, and if need be, to perform a new substitution;

when the door is provided with a position encoder, the position information may not be sent back to the control of the associated door, for saving time, and the failing door is thus operated, in case of failure, on the basis of position calculation algorithms.

The invention also relates to a high availability on-panel control system for the doors of a car, for the implementation of such method. Such system includes mutual checking means for associated control panels in order to transmit authorization signals of the exclusive opening of one of the two series of the opposite side doors, and the checking means combine a low speed signal and a validation side selection signal to perform, in each environment, opening/closing authorizations to the motor control of its system and to the motor control of the associated system.

Each door control panel preferably receives door position signals and sends signals for triggering the environmental conditioning devices for example lamps and buzzers, as well as the control means of the driving motor of the corresponding door. The word "panel" means an electronic control unit, dedicated here to the control of a car door and of the accessories of its environment connected to its close perimeter.

According to particular embodiments:

each door control panel receives door position signals and sends signals for triggering the environmental conditioning devices, as well as the control means of the driving motor of the corresponding door;

each door panel comprises switching means between the control means of the motor of a door and control means of the motor of at least one associated door, positioned on an opposite side wall, said position and triggering signals being then capable of being sent to the panel of the associated door in order to transfer the door control to the latter;

the position and triggering signals of a door are digital and transmitted to the associated remote door panel via a signal inlet/outlet module;

a transmission bus performs the transmission of the data from the inlet/outlet module of the panel of a door to the panel of the associated door;

life lines perform a mutual checking by connecting the panel of each door to the panel of each associated door in order to transmit the periodically refreshed control signals;

the triggering of the emergency procedure is generated from a life line continuum;

a filtering time is predetermined between a stoppage of the variation of the line control signal and the triggering of the intervention means on a failing panel by comparing the value of each signal;

the control means on a failing panel comprise means for stopping its power supply, power switches of the corresponding motor to the motor control circuit of the associated operational panel, in connection with the authorization control means for the opening of the doors on the opposite sides and means for locking the direction of motors;

the motor power switches between two associated panels activate, for each panel, an H bridge motor driving circuit having between terminals for selecting the motors to be driven, the takeover terminals being connected to the emergency mode terminals by means of connections, each circuit including the means for locking the direction of motors;

the opening authorizations controlling means are locked by a processing of the door speed and the opening or closing authorization signals for the doors on each side, according to a double, i.e. positive and negative, validation logic suite, in order to make the selection of the takeover of the motorization of a door on one side depend on the validation of an opening authorization on this side.

In order to guarantee the continuous operation of the door environment communication networks, the operational panel emulates a "network behavior" of the associated failing panel, either by neutralizing the failing panel or by driving a "bypass" (branching) of the network line at the level of the failing panel, thus keeping the failing panel on. The invention also applies to the accessories of the railway doors, more particularly the information diffusion loudspeakers and the door latch fittings. In the case where accessories are railway door environments loudspeakers, the failing control of a door environment loudspeaker being transferred to the operational control of the loudspeaker of the associated door environment. Advantageously, the control of the failing panel of a door environment loudspeaker is transferred to the control of the associated panel of a emergency loudspeaker of that environment.

According to another embodiment, each door control panel and the panel of the associated door have access to the same module sound generation module via transmission buses, each module supplying sound signals to at least one loudspeaker of each door environment, each module being positioned in each door environment. In the case of railway doors electric latch fittings, a switching of the control of each latch fitting, during the transfer of the control in emergency mode, is carried out according to the preceding method and the locking of the controls is carried by a logic gate of opening authorizations of a door system and a control through the logic gate of the opening authorization of the associated environment.

BRIEF DESCRIPTION OF DRAWINGS

Other characteristics and advantages of the invention will appear evident while reading in detail the description of one embodiment which follows and which refers to the appended drawings, which show, respectively.

DETAILED DESCRIPTION

Figure 1:
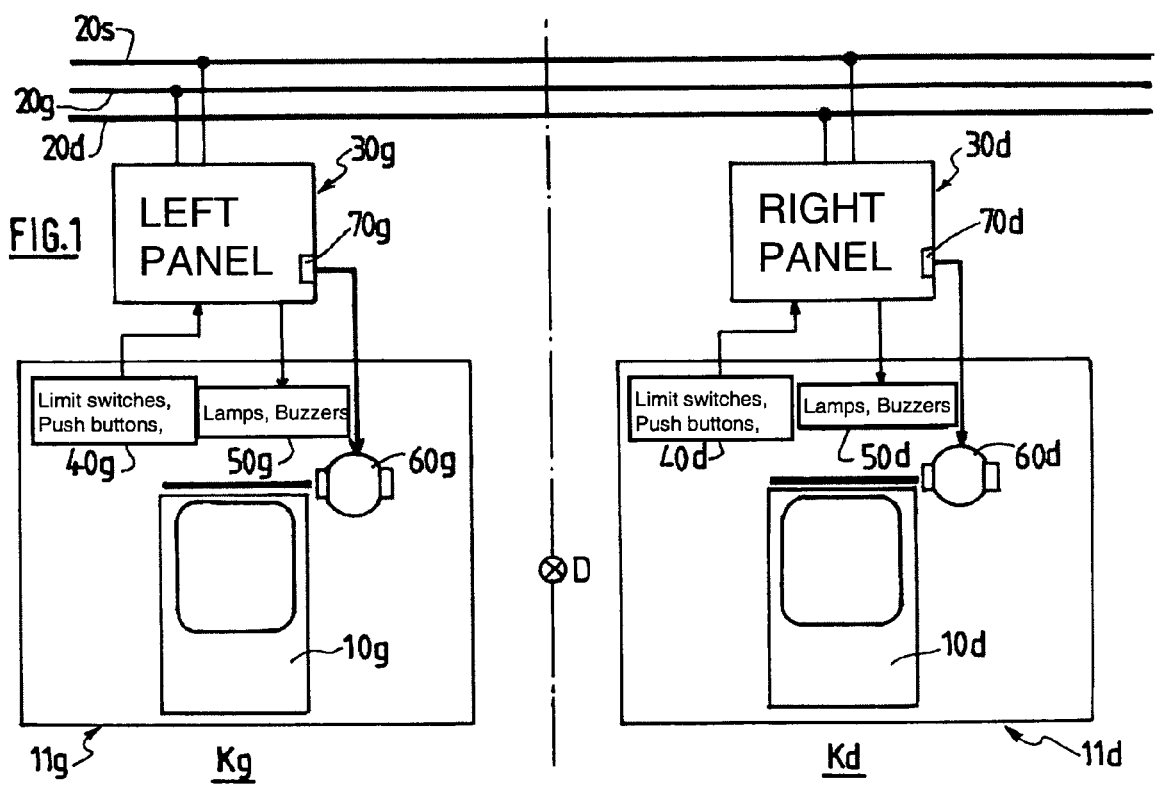
in FIG. 1, a schematic view of a door management by two side systems, according to the state of the art.

While referring to FIG. 1, the view shown relates to the management system, known by the state of the art, for a local door 10g, herein called the "left door" because of its position on the left longitudinal side Kg of the railway car rolling in direction D and an associated 10d door, the "right door" located on the opposite side Kd of the car. The system includes lines 20g and 20d for the serial transmission of the authorization signals, for the exclusive opening of the left side doors, among which the door 10g and the right side doors, among which the door 10d, respectively.

The transmission means also include a low speed signal line 20s in order to validate the transmitted authorizations signals. The transmission means of the signals of each series are coupled to control panels, respectively 30g and 30d, with the corresponding doors 10g and 10d. Each door control panel receives door position signals from the limit contacts and receives from the pushbuttons 40g and 40d. Besides, the panel sends triggering signals for the motor environmental conditioning devices 50g and 50d, by triggering lamps and buzzers, and includes control means for the driving motor, respectively 60g and 60d, of the corresponding door. The equipment (pushbutton, lamp, buzzer, motor, etc.) of each door 10g, 10d, is positioned in the environment 11g, 11d, of such door.

Figure 2:
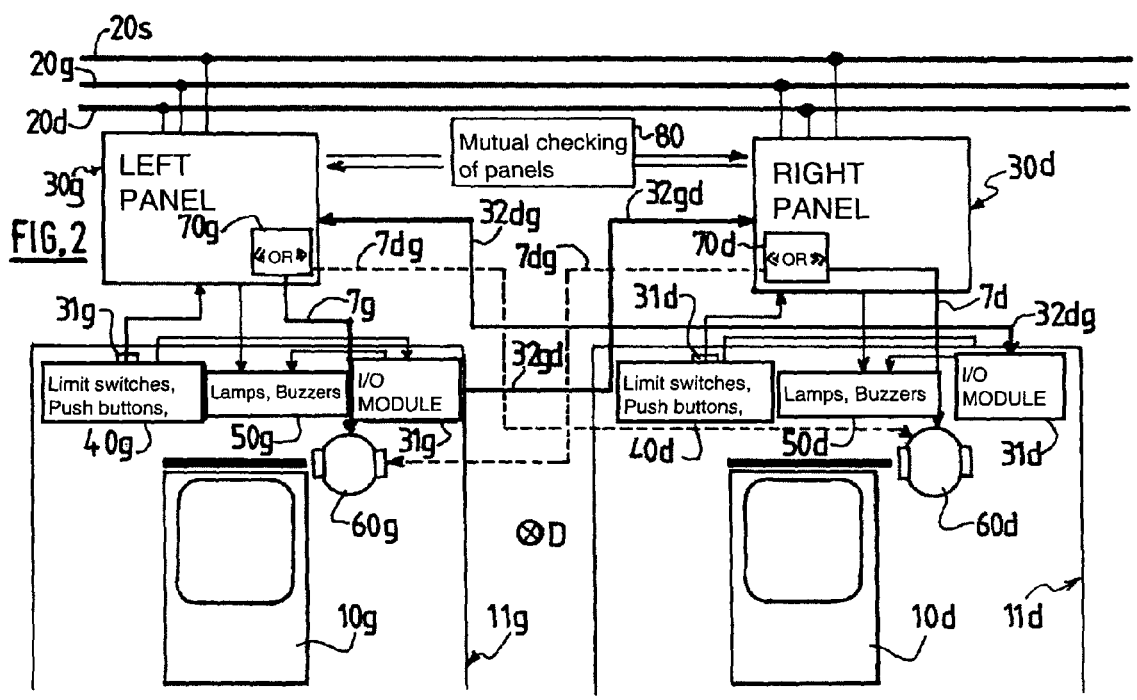
in FIG. 2, a schematic view of a door management by a control transfer system according to the present invention.

The basic means and connections for implementing the invention are illustrated while referring to the example in FIG. 2, where the same references indicate the same accessories. In this example, the panels 30g and 30d and the respective environments 11g and 11d of the doors 10g and 10d, positioned opposite each other on each side of the car, are associated. For this purpose, each motor control of the panels 30g and 30d of the door also includes motor power switching means 70g and 70d between the control connections 7g and 7gd (respectively 7d and 7dg) of the motors 60g and 60d (respectively 60d and 60g) for driving the associated doors 10g and 10d. The control connections 7gd and 7dg of a door panel for the motor of an associated door are shown in dotted lines in FIG. 2.

In this description, the switches can be relays, transistors or any other equivalent commutation accessories. In alternative solutions, doors not positioned opposite each other are associated or else each door is associated to more than one door on the opposite side.

Still referring to FIG. 2, each door control panel 30g and 30d receives signals from the corresponding door 10g and 10d position encoder 31g and 31d, corresponding to the pushbuttons 40g and 40d limit switches. In parallel, each panel 30g and 30d sends triggering signals to the respective environmental conditioning devices 50g and 50d, lamps and buzzers in the example. In case of failure, the position and triggering signals are transmitted to the panel of the associated door to transfer the failing control to the latter. Such door 10g or 10d position and triggering digital signals are then transmitted to the panel 30d or 30g on the associated door 10d or 10g, through a signal inlet/outlet module 31g, respectively 31d, and a transmission bus 32gd, respectively 32dg.

Figure 3:
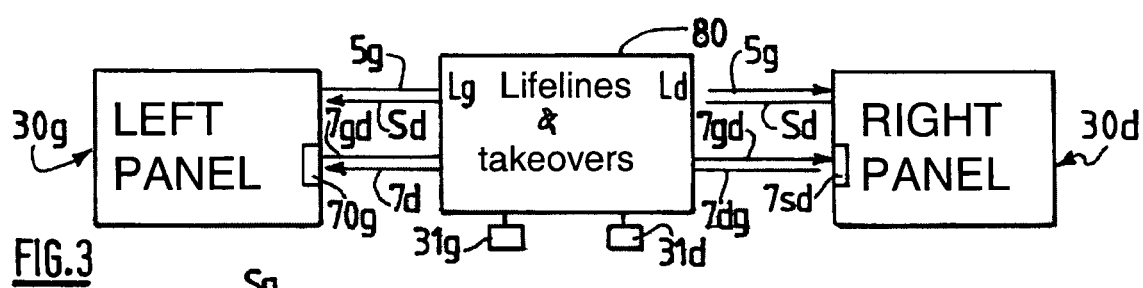
in FIG. 3, the diagram of the mutual checking of the door control panels according to the invention.

FIG. 3 shows, in a diagram, the mutual checking of the control panels 30g and 30d of the associated doors, according to the exemplary embodiment. The door opening and closing control signals are managed, in a safe way, by a mutual checking of the door controls through:

- periodical signals Sg and Sd exchanged between both door controls with a periodical refreshment, thus forming "life lines" Lg and Ld, and
- in case of acknowledgement of absence of variation of a periodical signal, in a life line mutual checking unit 80, the takeover of the motor control of the assumed failing panel, by the motor control of the operational panel.

The takeover of such control results in:
- the cutting of the power supply to the failing panel 30g or 30d;
- the changeover of switches 70d and 70g to connections 7dg or 7gd of the control of the motor of the failing control, to transfer the opening/closing management authorizations to the operational control;
- the activation of logical processing through the inlet/outlet module 31g or 31d mounted on the failing door, to the operational panel 30d or 30g.

Figure 4:
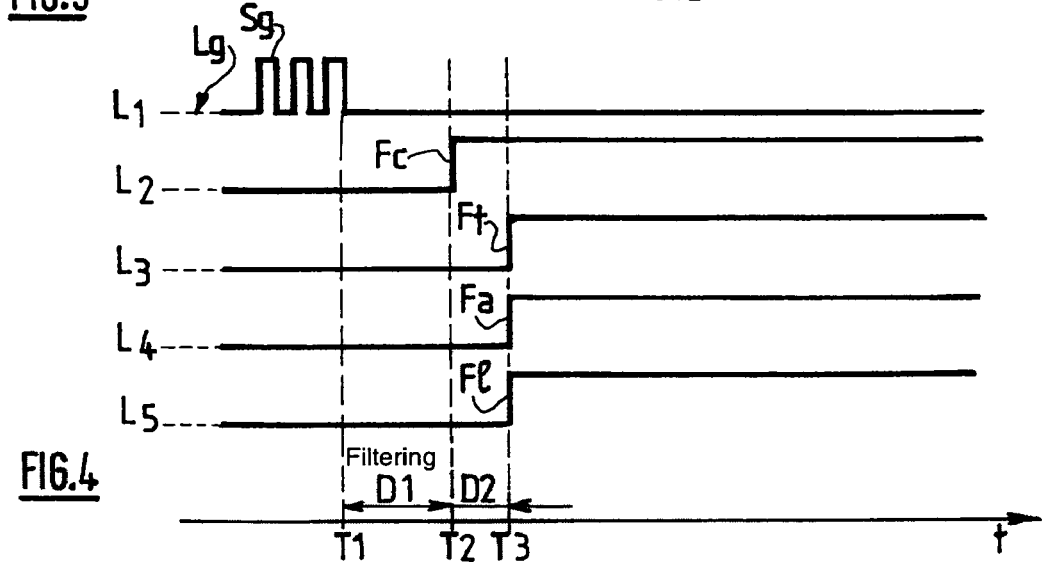
in FIG. 4, an assembly of chronograms illustrating the takeover of the control of the failing left panel.

The chronograms in FIG. 4 more precisely explain the succession over time "T" of timing sequences of a takeover of the right panel when the left panel is failing. The interruption of the variation of the periodical refreshment signal Sg of the life line Lg (line L1) at time T1 causes the triggering of the acknowledgement of a request for help by the control module at time T2 (edge Fc, line L2) after a filtering duration D1 equal to 1s in the example. A comparison of the value of each periodical signal, Sg in this example, detects an absence of variation. The triggering of the request for help induces at time T3 after a filtering duration D2 (equal to 500 ms in the example), the off-powering (edge Ft, line L3) of the failing panel, as well as the taking into account of the management authorization by the operational panel (edge Fa, line L4) and the sending of the motor control connections to the motor control of the operational panel (edge Fl, line L5).

Figure 5:
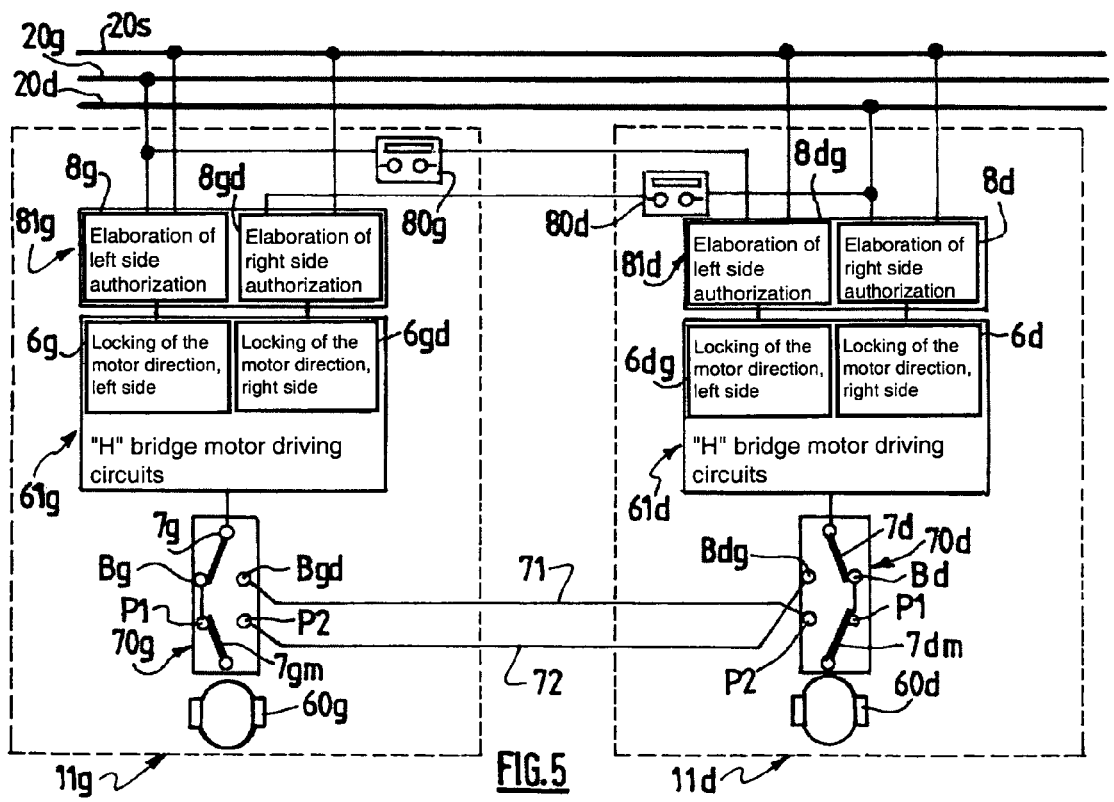
in FIG. 5, a diagram of the checking of the control of the motor direction of two associated doors in connection with a motor driving circuit.

FIG. 5 gives in detail, in an exemplary embodiment, the control modules 81g (61d) of the door opening/closing authorization registers, as well as the motors control and driving circuits. Each control module 81g (respectively 81d) for each door environment 11g (11d) is connected with an "H bridge" 61g (61d) motor driving circuit. Between the H bridge circuit and the motor 60g (60d), a motor 60g (60d) driving switch 70g (70d) makes it possible to switch the control of a door control panel to the associated panel. Each control module 81g (81d) includes registers 8g and 8gd (respectively 8d and 8dg) of generation of opening authorization for the local door and the associated door, the authorization registers of the same door environment 8g and 8gd (8d and 8gd) receiving the information of the authorization signal on the corresponding side 20g (20d) as well as the speed signal information 20s.

The opening authorization registers of the same door system, i.e. 8g and 8dg (respectively 8d and 8gd) are adjusted by a specific unit for the mutual takeover 80g (80dg) of each environment 11g (11d) by the associated environment. The authorization registers 8g and 8gd (8d and 8dg) of the same door environment 11g (11d) are connected to modules for locking the direction of motors 6g and 6gd (6d and 6dg) of the corresponding H bridge 61g (61d). The switches 70g and 70d are mounted together via the connections 71 and 72. Each switch 70g (70d) is dual and includes, in each door environment 11g (11d), a selector of the motor to be driven 7g (7d) between the terminals Bg and Bgd (B and Bdg) and a mode selector 7gm (7dm) between a nominal mode (position P1) and an emergency mode (position P2).

Figure 6:
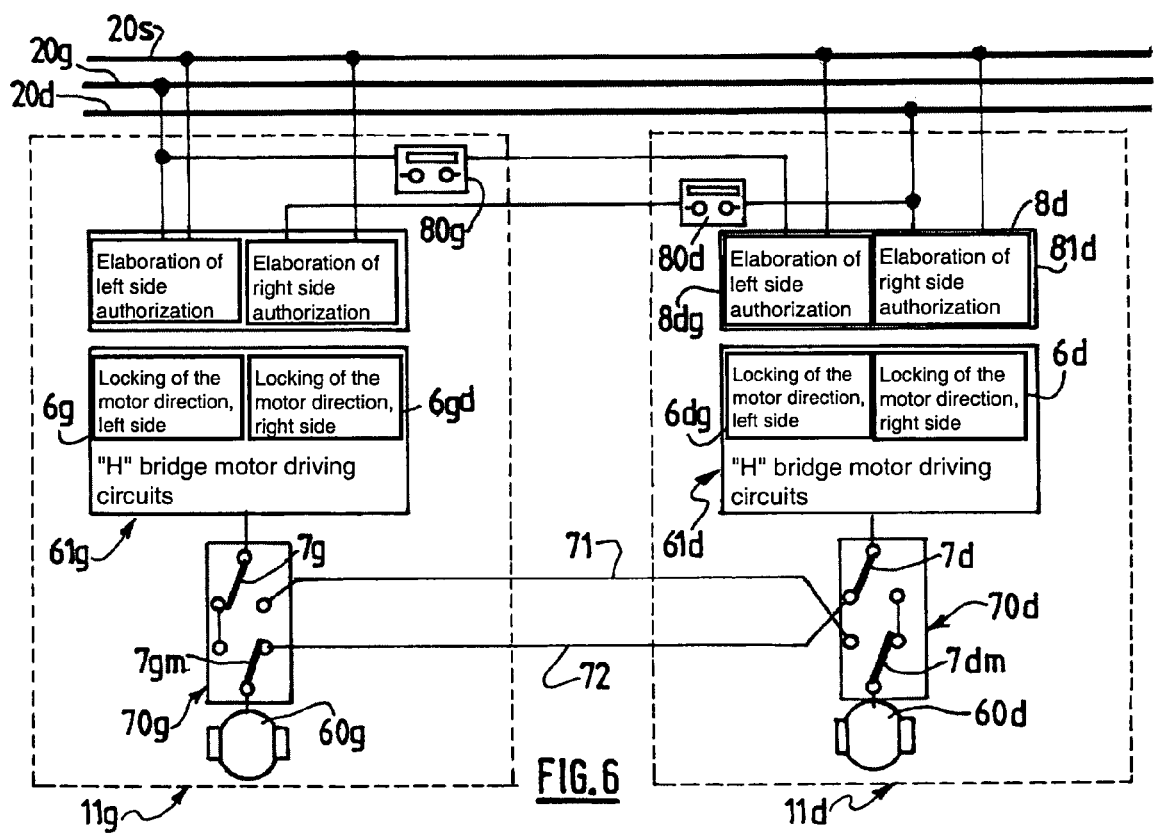
in FIG. 6, the preceding diagram during the takeover of the left panel by the right panel control.
Figure 7:
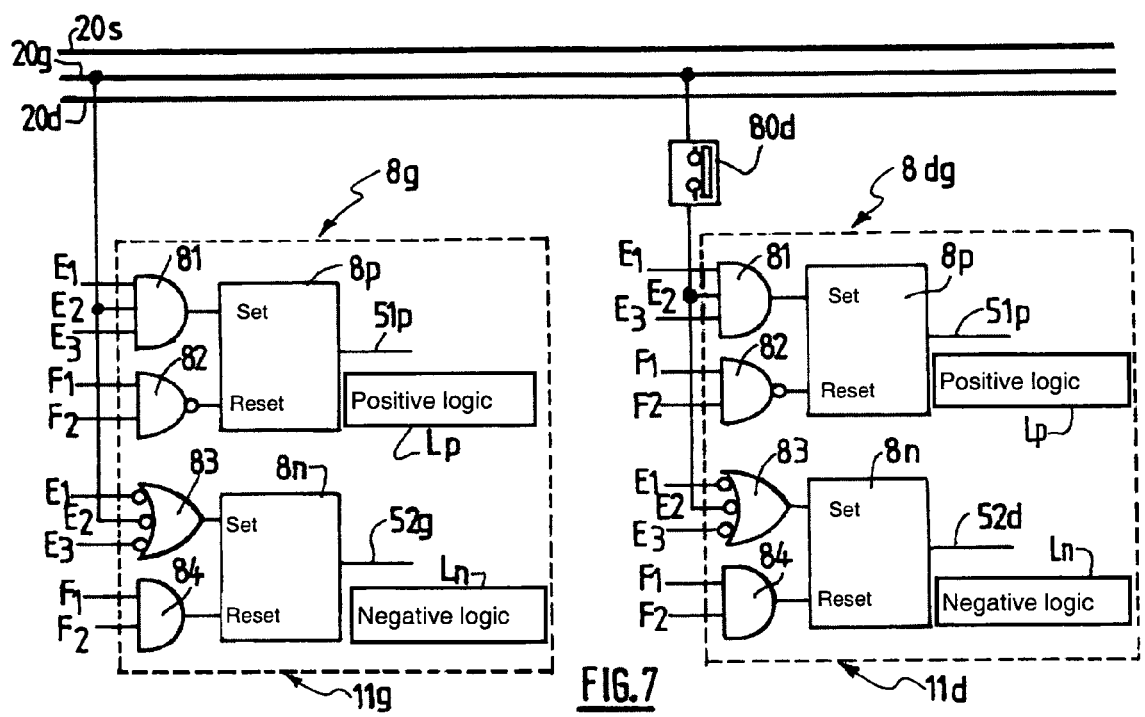
in FIG. 7, a diagram of the opening authorization generation registers.

During the takeover of a panel by the other panel, the panel 30g of the left door by the panel 30g of the right door in the example illustrated in FIG. 6 (which mentions the same accessories described in reference with FIG. 5), the mutual takeover unit 80d is active. Besides, the motor 60g is turned off by the mode selector 7gm in emergency mode position (position P2), whereas the motor selector 7d is positioned on the motor 60g (terminal Bdg). The generation of the side opening authorizations by logic inputs is more particularly explained in detail while referring to FIG. 7. The example relates to the takeover of the left door environment 11g. The left side authorization is generated by the left opening authorization registers 8g and 8dg which include the setting up of positive and negative combinatory logics, such registers receiving the left authorization information 20g, as well as the low speed signal 20s.

The positive logic LP combinatory sequence includes, for generating the left side authorization, a switch 8p whose inputs are:
- a logic gate "and" 81 whose inputs are: E1, the speed signal 20s; E2, the left door authorization information 20g and E3, the left side opening authorization digital control information, and
- a logic gate "nand" 82 whose inputs are: E1 and E3, the speed signal 20s and the digital control information.

The outputs S1g and S1d of the flip-flops 8p supply the values of the left side opening authorization level in a positive logic.

The negative logic Ln combinatory sequence also includes a flip-flop 8n whose inputs are a gate "or" 83 and a gate "and" 84. The inputs of gates 83 and 84 are identical to those of the positive logic gates. The output S2g and S2d of the flip-flops 8n supply the values of the left side opening authorization level, in negative logic.

Figure 8A:
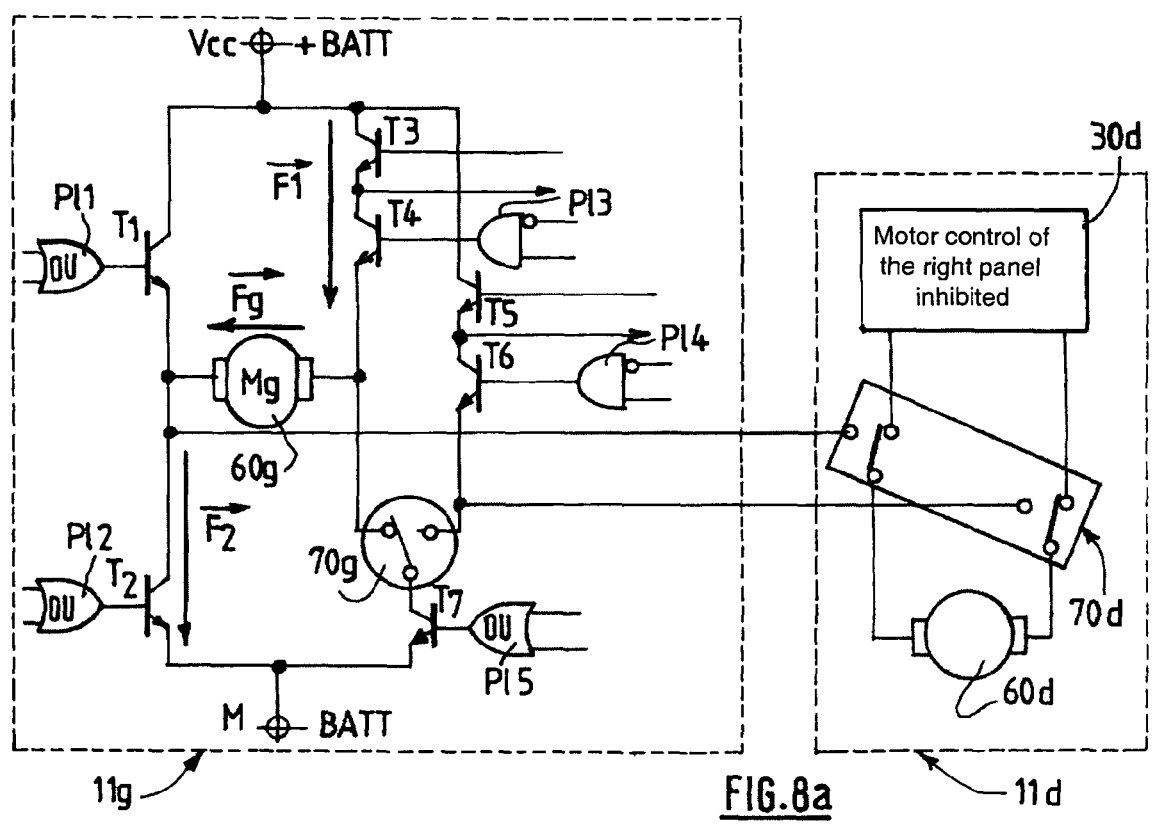
in FIGS. 8a and 8b, a diagram of the motorization for the opening and closing, during the control of the left panel for the motorization of the left door motor.
Figure 8B:
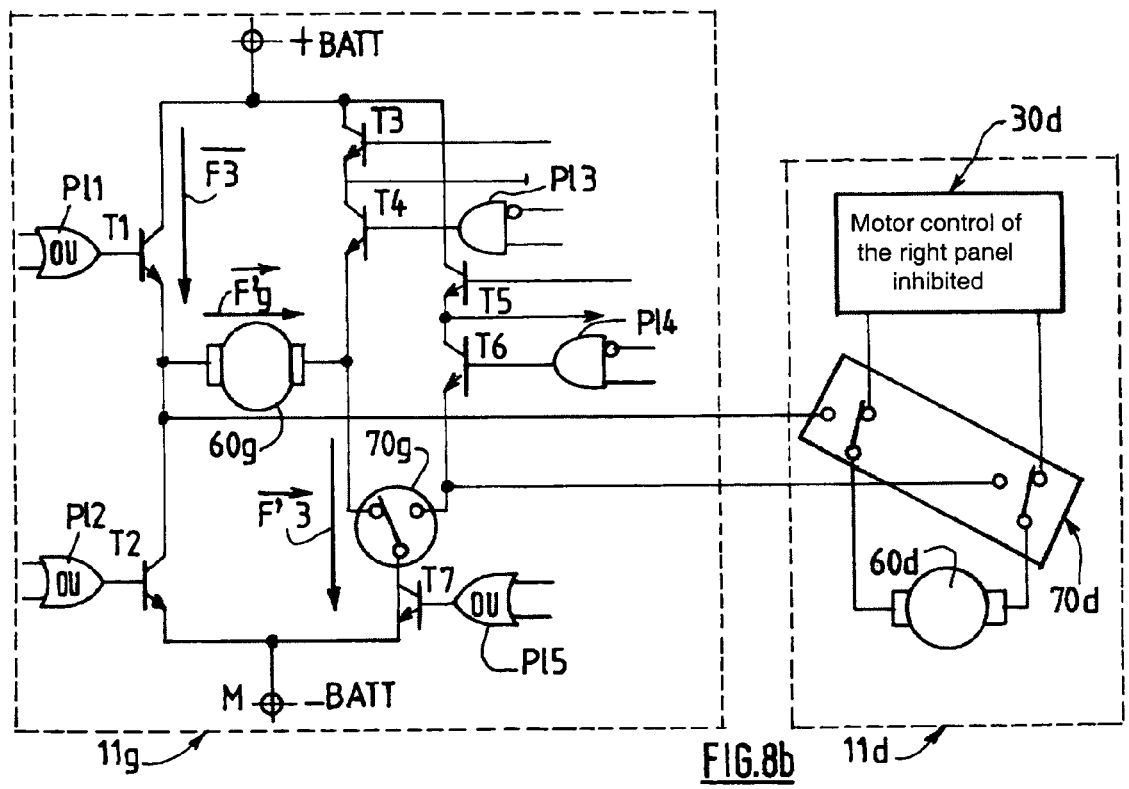
Figure 8C:
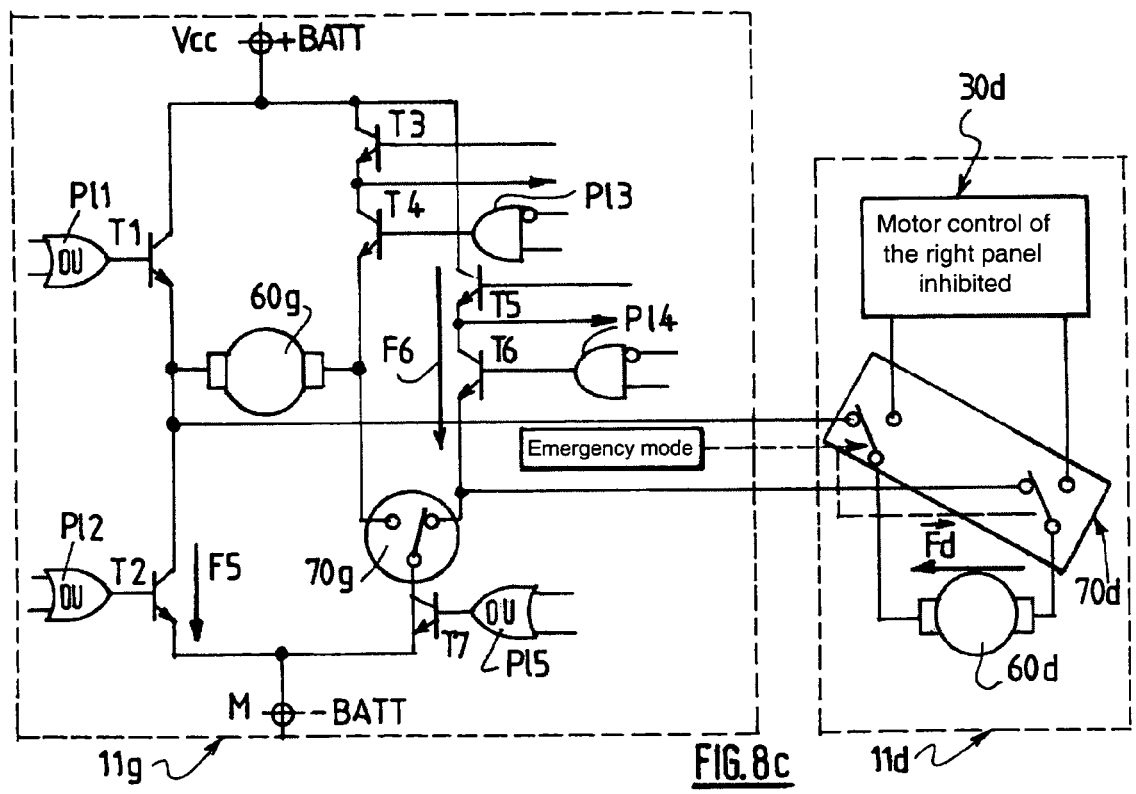
in FIGS. 8c and 8d, a diagram of the motorization for the opening and closing, during the takeover by the left panel of the control of the right panel for the motorization of the door motor.
Figure 8D:
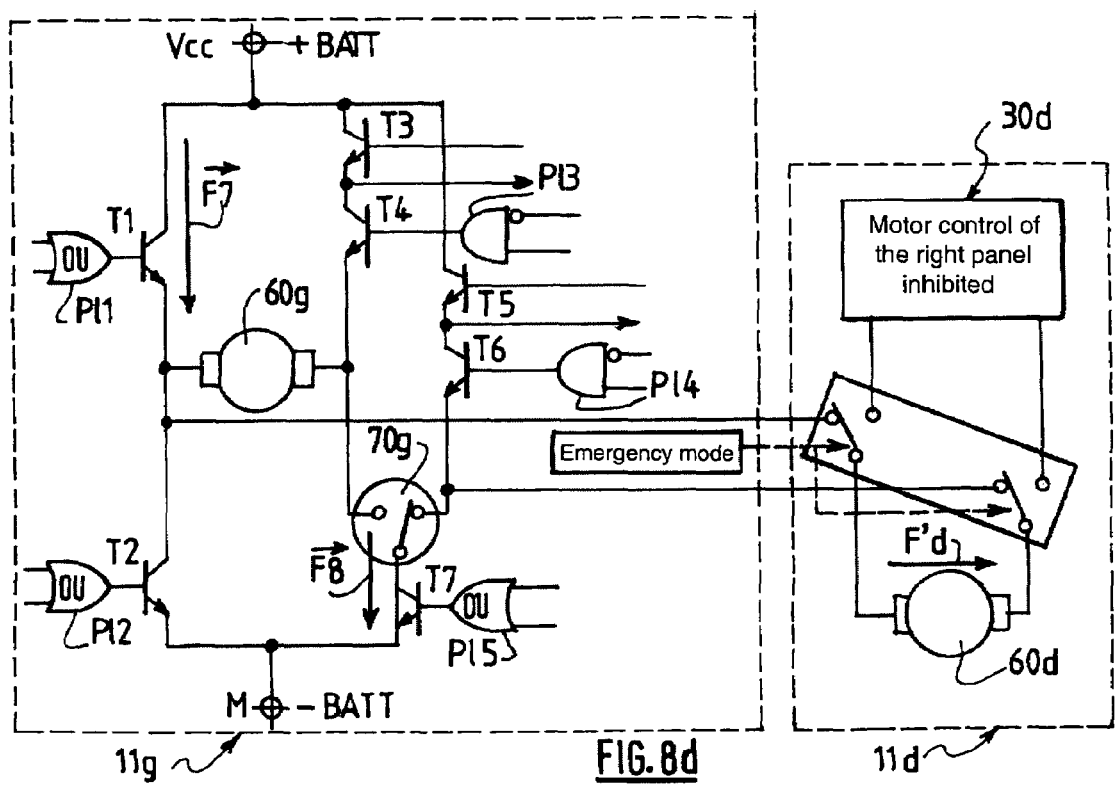

The FIGS. 8a and 8b illustrate a motorization diagram, respectively during the opening and the closing, upon the motor control of the left door motor 60g by the left panel motor control, i.e. during the nominal control of the left door motor. On the contrary, the FIGS. 8c and 8d show a motorization diagram respectively for the opening and the closing, after the takeover of the motor control of the right door motor 60d by the left panel control. The switch 70d of the right environment 11d of the right door is switched to activate, if need be, the right door motor control emergency mode 60d and the switch 70g of the environment 11g of the left door is in the motor 60g driving position.

The motorization for the opening of the left door by the left panel 30g is illustrated in FIG. 8a. In this Figure are shown, in the environment 11g of the left door, the transistors T1 to T7 of the H bridge control circuit, the transistors being in the on- or the off-state, depending on the state of logic gates P11 to P15. The transistors T1 and T7 are dedicated to the left and right sides closing control and the transistors T1 to T6 to the left and right sides opening control.

More particularly, the transistors T3 and T4 use the left opening authorization in positive and negative logic to control the opening of the left door, and the transistors T5 and T6 use the right opening authorization to control the opening of the right door. Both series of transistors, T3-T4 and T5-T6, are mounted in parallel. The motor is supplied by the continuous current supply terminal Vcc and the grounding "M".

During the motorization of the opening of the left environment 11g, the closing transistors T1 and T7 are in off-state and the transistors controlling the opening of the left door T3 and T4, in positive and negative logic, as well as transistor T2 are in the on-state (arrows $\vec{F}_1$ and $\vec{F}_2$). The transistors for the opening of the right door by the left panel T5 and T6, are in emergency mode. Under this condition, the motor 60g rotates in the direction corresponding to the direction of the arrow $\vec{F}_g$. The FIGS. 8b, 8c and 8d show the same accessories as those in FIG. 8a with the same reference signs.

During the motorization for the closing of the left door 60g by the left panel 30g (FIG. 8b):
the closing transistors T1 and T7 are in the on-state ($\vec{F}_3$ and $\vec{F}'_3$) and
the left door opening controlling transistors T2, T3 and T4 are in the OFF-state.
Then the motor rotates in the closing direction corresponding to the arrow $\vec{F}'_g$, i.e. in the direction opposite the previous direction corresponding to the opening.

Upon the transfer of the right door 60d motor control to the left panel 30g, the switch 70g is in the position for driving the right door motor 60d and the opening and closing motorizations are triggered as follows:
upon the right motor 60d opening (FIG. 8c) motorization (arrow $\vec{F}_d$, the closing transistors T1 and T7 as well as the left door opening control transistors T3 and T4, in positive and negative logic, are in the OFF-state or in emergency mode; the opening transistors T2 (right door control), T5 and T6 (opening authorizations in positive and negative logic) are in the ON-state (arrows $\vec{F}_5$ and $\vec{F}_6$);
upon the motor 60d closing (FIG. 8d) motorization (arrow $\vec{F}'_d$), the for the left door closing control transistors T1 and T7 (arrows $\vec{F}_7$ and $\vec{F}_8$) are in the ON-state, whereas the opening control transistors T2, T3 to T6 are in the OFF-state or in emergency mode. The motor 60d then rotates in the closing direction corresponding to the arrow $\vec{F}'_d$, io.e. in the direction contrary to the previous direction corresponding to the opening.

Figure 9:
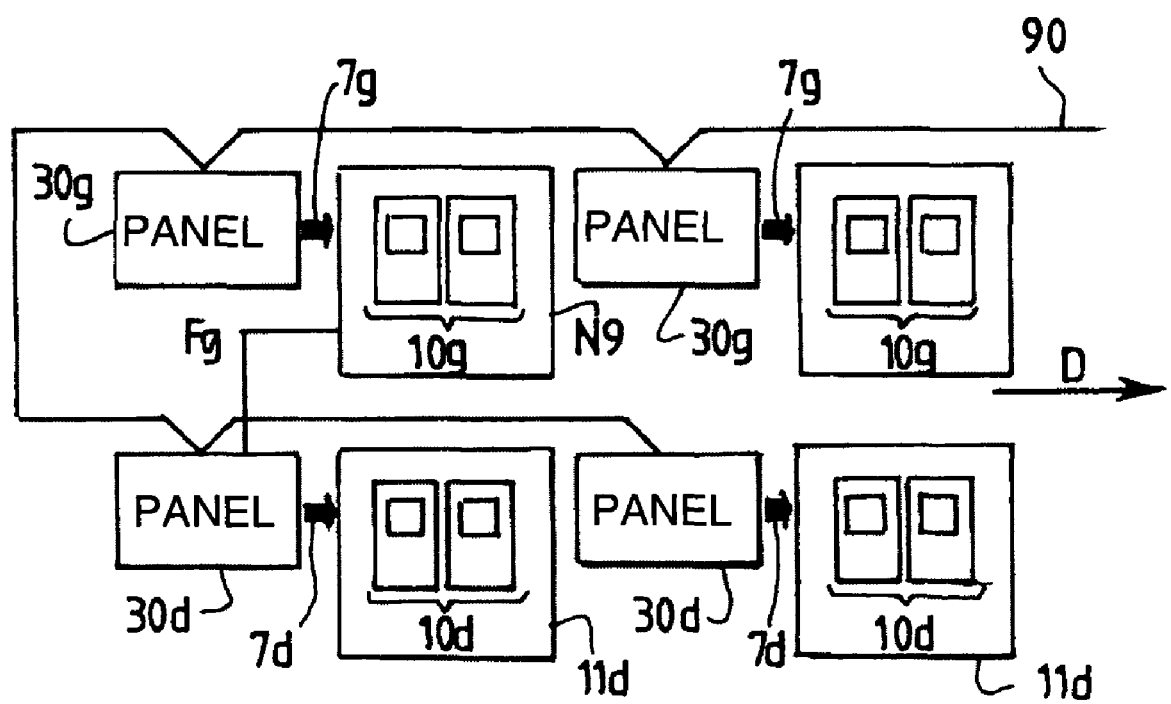
in FIG. 9, a communication network operation diagram using all the side doors in series associated according to the invention.

An application of the invention relates to the management of various communication networks (CAN, LON, MVB, ETHERNET, PROFINET, etc), carried out by the door environment of the railway lines when a panel control is failing, as illustrated while referring to FIG. 9. The communication is managed along the various systems 11g and 11d (of the doors 10g and 10d) mounted in series. The panels 30g and 30d control the doors 10g and 10d through controls 7g and 7d.

In order to take into account the management of the communication in network 90, an operational panel 30d emulates the "network behavior" of an associated failing panel 30g according to the previous method. The failure of the panel is materialized by a cross on the corresponding connection 7g. The takeover materialized by the arrow $\vec{F}_9$ then secures such an emulation in order to secure a continuous management. In the case of a "daisy chain" ETHERNET or PROFINET wiring, the assisted panel remains ON in order to provide a bypass (a branching) of the network line at the subscriber level.

Figure 10A:
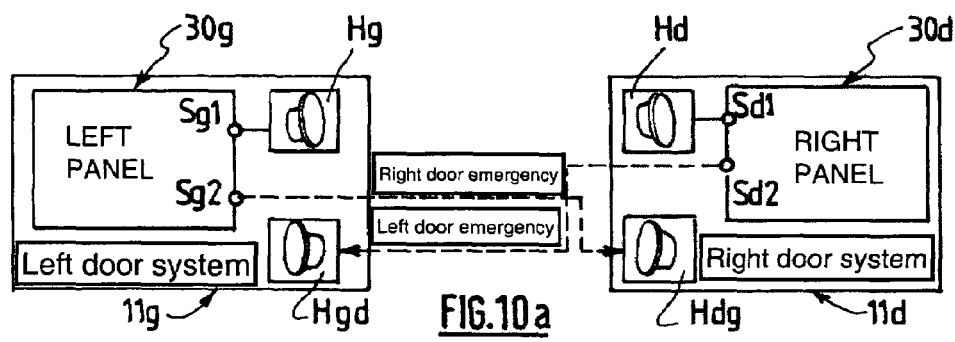
in FIGS. 10a and 10b, a diagram illustrating one application of the invention to the management of the loudspeakers of associated doors according to two mountings with or without an external module; and in FIG. 11, a diagram illustrating an application of the invention to the electric latch fittings of associated doors.
Figure 10B:
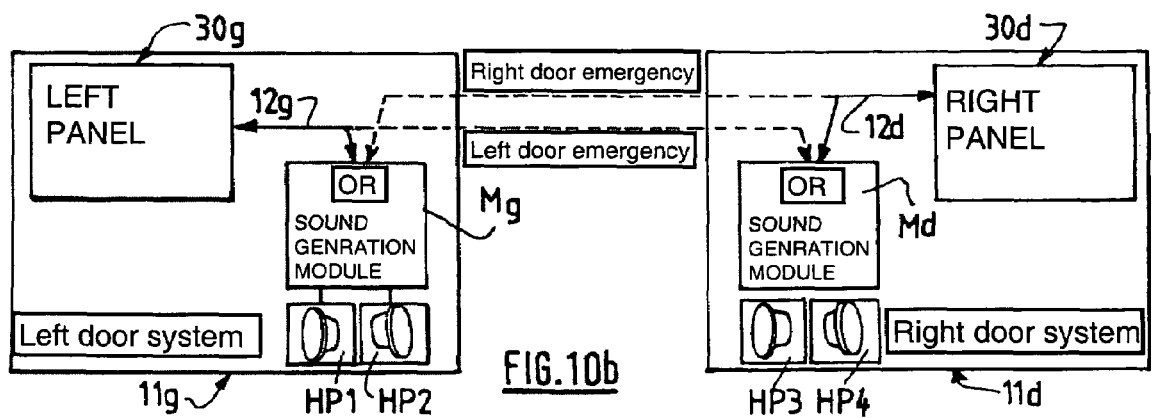

While referring to the FIGS. 10a and 10b, the application of the invention to the management of the loudspeakers of associated doors is illustrated by two examples. The solution shown in FIG. 10a assumes that each environment 11g (11d) of the panel 30g (respectively 30d) integrates a sound generation module and has two sound output devices Sg1 and Sg2 (respectively Sd1 and Sd2). The outlets of each panel supply a local loudspeaker Hg (Hd), and an emergency loudspeaker Hgd (Hdg) located in the environment of the associated door. The takeovers on the loudspeakers in case of failure are performed in this example, by the same transmission mechanisms as for the motors: a panel 30g (30d) controls the emergency loudspeaker of the associated door.

As an alternative, only one loudspeaker per door is provided and the emergency equipment relates to the failing control of a loudspeaker. In this case, the control of the loudspeaker is transmitted to the operational control of the panel of the associated door.

According to another exemplary embodiment (FIG. 10b), the associated panel 30g and panel 30d, have access to two sound generation modules, Mg and Md, localized in each system 11g (11d) of each door. The transmission of the panel control signals to the sound generation modules is carried out by dedicated transmission buses 12g (12d). The module Mg supplies two loudspeakers HP1 and HP2 for the left door, and the module Md the loudspeakers HP3 and HP4 for the right door. Each module provides sound signals to at least one loudspeaker of the corresponding door. In nominal mode, each panel 30g (30d) controls the corresponding sound generation module Mg (Md). In the emergency mode, the control of the failing panel 30g (30d) is transmitted to the control of the associated panel 30d (30g) via the portion drawn in dotted lines in FIG. 10b, of the corresponding bus 12d (12g).

Figure 11:
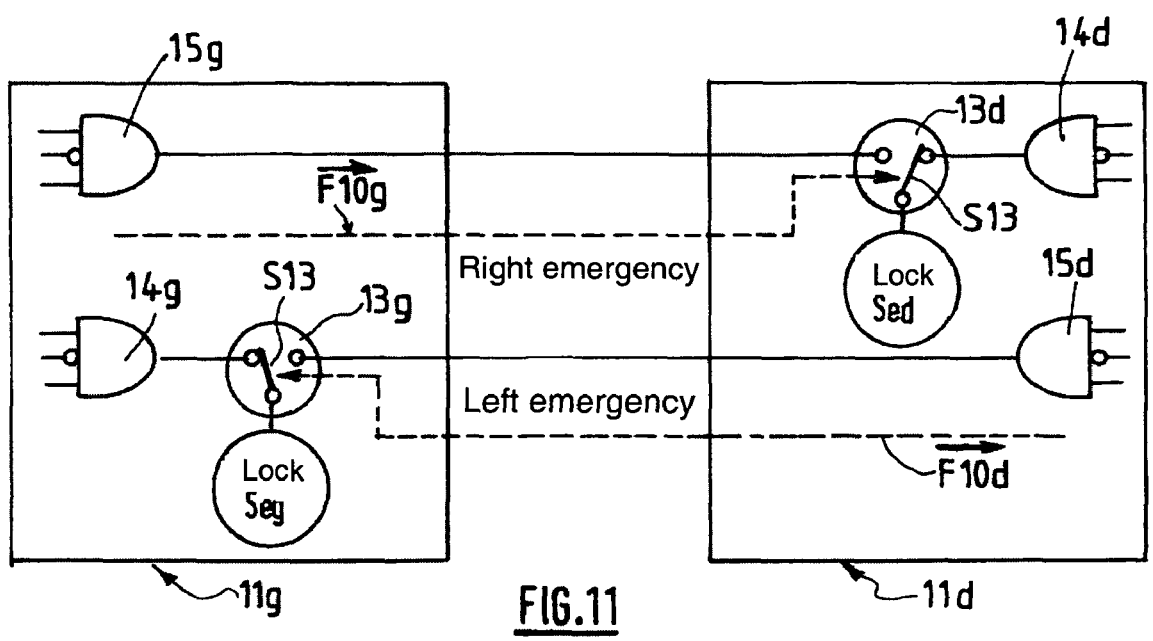

Another application relates to the electric latch fittings of the associated doors 10g and 10d, while referring to FIG. 11. Each system 11g (11d) for a door is provided with a latch fitting control switch 13g (13d) Seg (Sed) of the corresponding door. In nominal mode, the control of the latch fitting Seg (Sed) via the logic gate 14g (14d) utilizing the opening positive and negative authorization is carried out by the corresponding panel.

In emergency mode, the latch fitting control Seg (Sed), via the switching of the selector S13 of the switch 13g (13d) is dedicated to the associated doors system control panel 11d (11g). The control is carried out through the logic gate 15d (15g), the logic gate 15d (15g) using the double positive and negative authorization logic corresponding to the arrow $\vec{F}_{10g}$ ($\vec{F}_{10d}$).

The invention is not limited to the exemplary embodiments described and shown. For example, it is thus possible to provide an adaptation of the invention more particularly to the opening/closing of car inner doors, to air-conditioning motors and to a car brake control.

The invention claimed is:
1. A high availability control method for railway door systems of a car, positioned along two longitudinal opposite sides of the car, the method comprising:
(a) a mutual checking for controlling at least two associated control panels for transmitting authorization signals of the exclusive opening of one of at least two series of opposite doors through periodical exchanges between controls for door systems on opposite sides of the car, the mutual checking combining a low speed signal and a validation side selection signal to perform, in each side of the car, opening/closing authorizations to the motor control of a first series of doors and to the motor control of the associated second series of doors;

(b) a detection of a control failure of one of the at least two series of opposite doors whose opening or closing is requested in case of an absence of the periodic exchanges between the controls;

(c) an automatic transfer of the failing control to an operational control of at least one associated first series of doors located along the longitudinal opposite side relative to the second series of doors;

(d) an automatic substitution of the failing control with the associated operational control; and (e) opening authorizations controlling means for controlling the opening/closing authorizations being locked by a processing of the low speed signal and the authorization signals of the exclusive opening of one of the at least two series of opposite doors, according to a double validation logic suite, positive and negative, in order to make the selection of the takeover of the motor control of one of the first and second series of doors on one side depending on the validation of the opening authorization on this side.

2. A control method according to claim 1, wherein a takeover of an assumed failing control in the absence of a periodic detection is automatically managed by neutralizing such control and by transferring the opening authorization to the associated control from a combination between a low speed signal and a validation side selection signal.

3. A control method according to claim 1, further comprising generating the opening authorization by opening authorization registers which include setting up of positive and negative combinatory logics, the registers receiving the authorization signals of the exclusive opening of one of the at least two series of opposite doors, as well as the low speed signal.

4. A control method according to claim 3 wherein a positive logic combinatory sequence implementing the positive combinatory logics includes, for generating the opening authorization, a switch whose inputs are:

a logic gate "and" whose inputs are: the low speed signal, the authorization signal of the exclusive opening of one of at least two series of opposite doors, and the side opening authorization digital control information;

a logic gate "nand" whose inputs are the low speed signal and the digital control information; and outputs of the flip-flop supplying the values of the side opening authorization level in a positive logic.

5. A high availability method according to claim 1, further comprising transferring failing control of a loudspeaker associated with one of the doors to the operational control of a loudspeaker associated with another of the doors.

6. A high availability method according to claim 5, further comprising transmitting the control on a failing panel of at least one of the loudspeakers to the control of an associated panel of an emergency loudspeaker.

7. A high availability method according to claim 1, further comprising providing loudspeakers of the environment of the railway doors, providing access of each door control panel and the panel of the associated door to the same sound generation module through transmission buses, each module supplying sound signals to at least one of the loudspeakers of each door environment, and positioning each module in each door environment.

8. A high availability method according to claim 1, further comprising providing electric latch fittings of the environments of the railway doors, and a switching of the control of each latch fitting during transfer of control in an emergency mode is carried out between a latch fitting control by a logic gate of a door environment opening authorization and a control through a logic gate of the associated environment opening authorization.

9. A control method for use with a railway car, the method comprising:

(a) detecting a failure with regard to a first railway car door;

(b) automatically checking control signals from a controller associated with at least a second railway car door;

(c) automatically causing the controller associated with the second door to takeover control of the first door if the failure is detected, at least in part by transferring authorization to the controller from a combination of a low speed signal and a validation side selection signal; and (d) locking opening/closing authorizations by processing of the low speed signal and authorization signals of exclusive opening of one of the doors, according to a double validation logic suite in order to make a takeover selection of a motor control of at least one of doors on one side depending on the validation of the opening authorization on the same side.

10. The control method according to claim 9, further comprising:

(a) receiving door position signals by the controller and sending signals for triggering environmental conditioning devices;

(b) using life line mutual checking of a controller associated with the first door and the controller associated with the second door through periodic signals exchanged between both controllers with a periodic refreshment; and (c) the controller associated with the second door performing the taking over action by performing at least the following:

(i) terminating a power supply to the first controller;

(ii) changing switches to allow the controller associated with the second door to control a motor associated with the first door; and (iii) the controller associated with the second door activating logical processing through an inlet/outlet module mounted on the first door.

11. A high availability control method for use with a railway car, the railway car having a first door disposed on a first longitudinal side of the railway car and a second door disposed on a second opposing longitudinal side of the railway car, the control method comprising: providing a first control operably coupled to the first railway car door, the first control operably managing opening actuation of the first door; providing a second control operably coupled to the second railway car door, the second control operably managing opening actuation of the second door; outputting periodic mutual checking signals between the first control and the second control; detecting cessation of at least some of the periodic mutual checking signals and determining the first control to be a failed control; and transferring management authorization from the first control to the second control in response to the determination of the first control to be the failed control, the second control operably managing opening actuation of both the first door and the second door; causing the first and second controls to interact even if no failure is detected; and automatically causing the transferring management authorization step and the second control operably managing opening actuation of both doors step.

12. A high availability control method for use with a railway car, the railway car having a first door disposed on a first longitudinal side of the railway car and a second door disposed on a second opposing longitudinal side of the railway car, the control method comprising: providing a first control operably coupled to the first railway car door, the first control operably managing opening actuation of the first door; providing a second control operably coupled to the second railway car door, the second control operably managing opening actuation of the second door; outputting periodic mutual checking signals between the first control and the second control; detecting cessation of at least some of the periodic mutual checking signals and determining the first control to be a failed control; and transferring management authorization from the first control to the second control in response to the determination of the first control to be the failed control, the second control operably managing opening actuation of both the first door and the second door; transmitting digital door position and triggering signals to assist in transferring the control of at least one of the doors; sending signals from a door position encoder and door switch to the first control; automatically transferring the signals from the door position encoder and door switch to the second control if a failure is detected;

switching control of the doors using an H bridge circuit; and actuating a motor commutator to open and close the first door based on a signal from the second control.

\* \* \* \* \*